United States Patent Office 3,391,710
Patented July 9, 1968

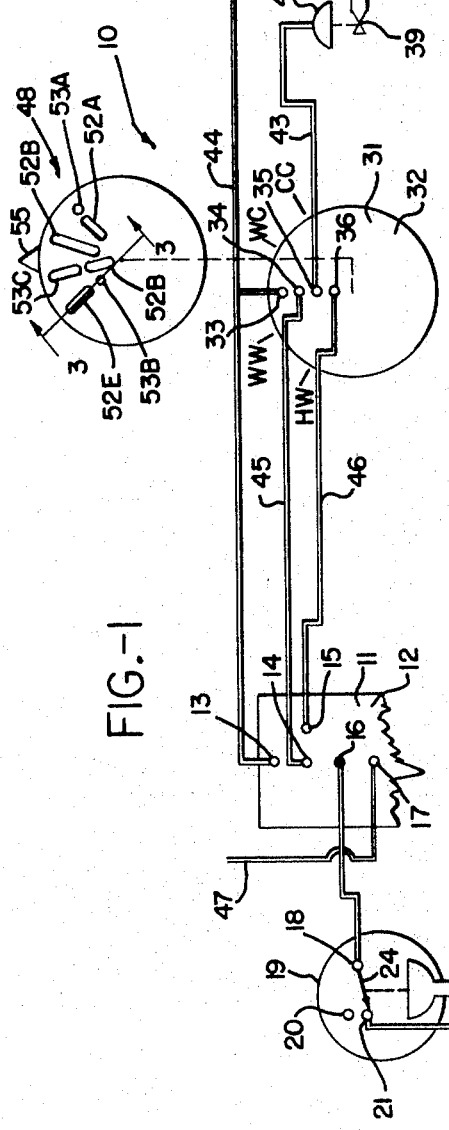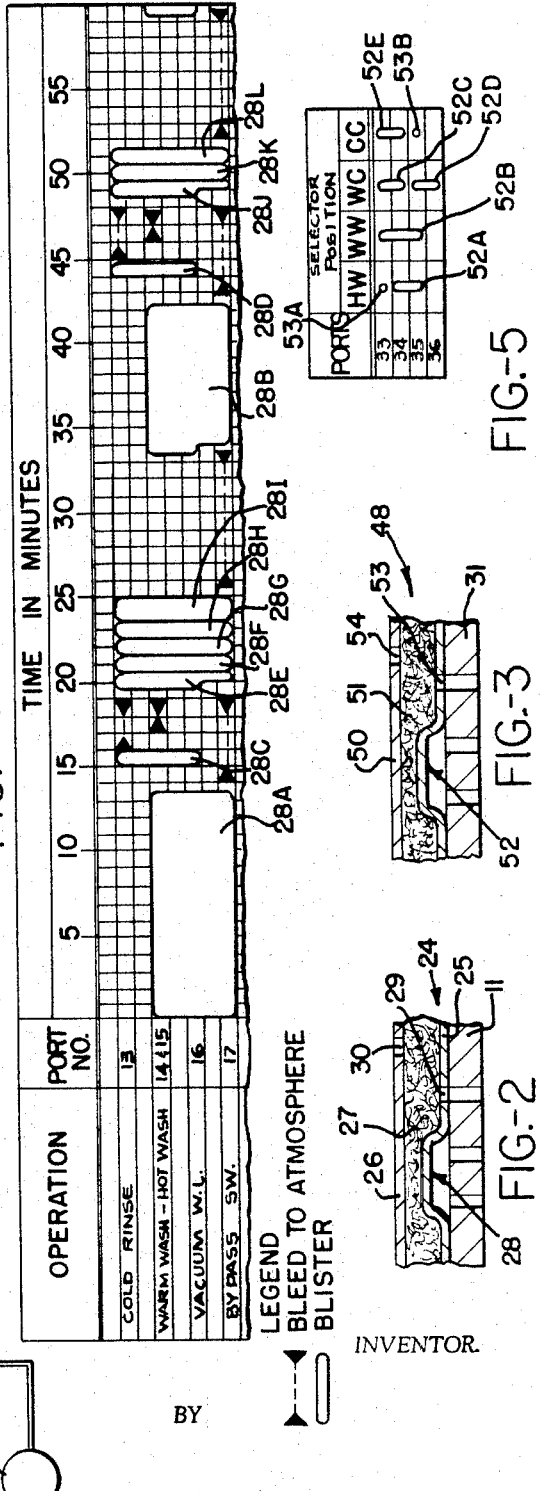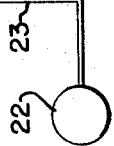

3,391,710
WATER TEMPERATURE PNEUMATIC
SELECTION MEANS
Harold W. Rice, Fullerton, Calif., assignor to Robertshaw
Controls Company, Richmond, Va., a corporation of
Virginia
Filed Mar. 10, 1965, Ser. No. 438,632
18 Claims. (Cl. 137—624.2)

ABSTRACT OF THE DISCLOSURE

This disclosure relates to a pneumatic control system for a washing machine or the like wherein a water mixing valve has a hot water pneumatically operated actuator and a cold water pneumatically operated actuator selectively controlled by a manual selector valve means which in various positions thereof will interconnect a vacuum source from a main timer moved program member through the selector valve means to the water mixing valve to provide wash water at the selected temperature for a washing cycle and water at the selected temperature for a rinse cycle when the main program member interconnects the vacuum source to the water mixing valve in a predetermined sequence in the timed movement of the main program member, the main program member having a plurality of vertically aligned ports in a reading head thereof and another port horiozntally aligned with the vertically aligned ports.

---

This invention relates to improved means for controlling the temperature of water being directed into a domestic appliance or the like, such as a washing machine or the like.

It is well known that in various washing machine some means must be provided for selecting the temperature of the water for the wash cycle thereof as well as for selecting the temperature of the water during the rinse cycle thereof.

According to the teachings of this invention, improved means are provided for water temperature selection for a washing machine or the like wherein the washing machine or the like is pneumatically controlled.

Accordingly, it is an object of this invention to provide an improved washing machine system having one or more of the novel features set forth above or hereinafter shown or described.

Other objects, uses and advantages of this invention are apparaent from a reading of this description which proceeds with reference to the accompanying drawings forming a part thereof and wherein:

FIGURE 1 is a schematic view illustrating the improved system of this invention.

FIGURE 2 is an enlarged, fragmentary, cross-sectional view illustrating the main program means of the system of FIGURE 1.

FIGURE 3 is a view similar to FIGURE 2 and illustrates the temperature selecting means of FIGURE 1.

FIGURE 4 is a flow diagram illustrating the operation of the system of FIGURE 1.

FIGURE 5 is a chart illustrating the various positions of the selector valve of FIGURE 1.

While the various features of this invention are hereinafter described and illustrated as being particularly adaptable for providing water temperature for a washing machine or the like, it is to be understood that the various features of this invention can be utilized singly or in any combination thereof to provide control means for other devices as desired.

Therefore, this invention is not to be limited to only the embodiments illustrated in the drawing, because the drawing is merely utilized to illustrate one of the wide variety of uses of this invention.

Referring now to FIGURE 1, the improved system of this invention is generally indicated by the reference numeral 10 and comprises a main reading head 11 having the reading surface 12 thereof interrupted by a plurality of ports 13, 14, 15, 16 and 17, it being understood that the reading head 11 has other ports therein for interconnection to other pneumatic actuators of a washing machine or the like. However, since this invention mainly concerns the use of the ports 13-16, the other ports and the operating mechanism associated therewith need not be disclosed.

The port 16 in the reading head 11 is interconnected by a flexible conduit means to a port 18 in a water level control device 19 having two other ports 20 and 21, the port 20 being interconnected to the atmosphere and the port 21 being interconnected to the inlet side of a vacuum pump 22 by flexible conduit means 23.

The water level control device 19 has a means 24 which will interconnect the ports 21 and 18 together when the water in the washing machine is below a predetermined level. However, when the water in the washing machine reaches a predetermined level, the means 24 disconnects the vacuum port 21 from the port 18 and interconnects the port 20 to the atmosphere port 18 for a purpose hereinafter described.

The ports 13, 14, 16 and 17 of the reading head 11 are disposed in vertical alignment while the port 15 is disposed in horizontal alignment with the port 14 for a purpose hereinafter described.

A program member 24, FIGURE 2, moves over the reading surface 12 of the reading head 11 in any suitable manner and comprises a flexible tape-like member 25 interconnected to a rigid backing member 26 to move in unison therewith and being spaced therefrom by a porous compressible material 27. The reading sheet 25 has a plurality of open ended blisters 28 formed therein and adapted to bridge certain ports of the reading head 11 in a manner hereinafter described to interconnect those ports together. In addition, the reading sheet 25 has a plurality of aperture means 29 formed therethrough to be selectively aligned with certain of the ports in the reading head 11 to permit air to pass through the aligned port in the reading head 11 by first passing through a suitable aperture means 30 in the backing member 26 and be filtered by the material 27 before the same passes through the aperture means 29 in the reading sheet 25.

As illustrated in FIGURE 4, the blisters 28 and aperture means 29 are formed in a predetermined pattern whereby a wide blister means 28A is adapted to not only bridge the vertically aligned ports 14, 16 and 17 but also the horizontally aligned port 15 to interconnect all the ports 14-17 together while the blister means 28A is passing over the reading surface. Similarly, another blister means 28B also is adapted to interconnect together all of the ports 14-17 when that particular blister means 28B passes over the reading surface 12 of the reading head 11.

However, the reading sheet 25 has narrow, vertical blisters 28C and 28D adapted to only interconnect together the ports 13, 14 and 16 when the same pass over the reading surface 12 of the reading head 11.

The reading member 25 also has a plurality of relatively long narrow blisters 28E, 28F, 28G, 28H, 28I, 28J, 28K, and 28L which are each adapted to only bridge the vertically aligned ports 13, 14, 16 and 17 when the same move across the reading surface 12 of the reading head 11.

Another reading head 31 is provided and has a reading surface 32 interrupted by four vertically aligned ports 33, 34, 35 and 36.

A water mixing valve 37 is provided and has an outlet 38 for directing water into the washing machine, the mixer valve 37 having a hot water inlet 39 and a cold water inlet 40. The hot water inlet 30 of the mixer valve 37 is controlled by a pneumatic actuator 41, the actuator 41 when at atmospheric conditions closes the hot water inlet 38 and when evacuated by having the vacuum source 22 interconnected thereto opens the hot water inlet 39. Similarly, a pneumatic actuator 42 controls the cold water inlet 40 in such a manner that when the actuator 42 is interconnected to the atmosphere, the same closes the cold water inlet 40 and when evacuated by being interconnected to the vacuum source 22 opens the cold water inlet 40.

The hot water actuator 41 is interconnected to the port 35 of the reading head 31 by flexible conduit means 43. The cold water actuator 42 is interconnected to the port 33 of the reading head 31 and to the port 14 of the reading head 11 by flexible conduit means 44. The port 34 of the reading head 31 is interconnected to the port 13 of the reading head 11 by flexible conduit means 45. The port 36 of the reading head 31 is interconnected to the port 15 of the reading head 11 by flexible conduit means 46.

The port 17 of the reading head 11 is interconnected to any desired actuator by a flexible conduit 47.

A program member 48 is adapted to rotate relative to the reading head 31 by being manually positioned relative thereto, the program member 48 comprising a flexible reading sheet 49 attached to a rigid backing member 50 spaced therefrom by a porous compressible material 51 in much the same manner as the program member 24 previously described.

The reading sheet 49 of the program member 48 has a plurality of open ended blisters 52 formed therein for bridging certain of the ports in the reading head 31, the reading sheet 49 also having a plurality of aperture means 53 provided therein for alignment with certain of the ports in the reading head 31 to permit atmosphere to pass through an aperture means 54 in the backing member 50 and be filtered by the porous flexible material 51 before the same enters the port of the reading head 31 through the aperture means 53 of the reading sheet 49.

As illustrated in FIGURE 1, the program member 48 has an indicator 55 which can be positioned in the positions indicated in FIGURE 1 by "HW"; "WW"; "WC" and "CC", whereby the "WH" position of the program member 48 selects a hot wash cycle and a warm rinse cycle, the "WW" position selects a warm wash cycle and a warm rinse cycle, the "WC" position selects a warm wash cycle and a cold rinse cycle while the position "CC" selects a cold wash cycle and a cold rinse cyle.

It can be seen in FIGURES 1 and 5 that when the indicator 55 is pointing to the hot wash and warm rinse position "HW," a blister 52A bridges the ports 34 and 35 in the reading head 31 while an aperture means 53A of the program member 48 is aligned with the port 33. When the indicator 55 is in the warm wash and warm rinse position "WW," an elongated blister means 52B of the program member 48 bridges the ports 33, 34 and 35. When the indicator 55 is in the warm wash and cold rinse position "WC," a first blister means 52C bridges the ports 33 and 34 and an aligned blister means 52D bridges the ports 35 and 36. When the indicator 55 is in the cold wash and cold rinse position "CO," a blister means 52E bridges the ports 33 and 34 while an aperture means 53B is aligned with the port 35.

Therefore, it can be seen that the program members 24 and 48 cooperate together to direct the water into the washing machine at the temperature selected by the program member 48 in a unique and novel manner.

In order to illustrate the operation of the system 10, it will be assumed that the operator has desired to have a hot wash cycle and a warm rinse cycle whereby the selector program member 48 is disposed in the position "HW" to have the blister 52A thereof bridge the ports 34 and 35 and have the aperture 53A aligned with the port 33 in the reading head 31. It is also assumed that the operator has adjusted the program member 24 to select a regular fabric washing cycle as represented between the time "0" minute increment and "34" minute increment as illustrated in FIGURE 4, the position of the program member 24 between "34" minute increment and "60" minute increment position being for wash and wear fabrics.

It can be seen that between the "0" minute increment and "13½" minute increment of movement of the program member 24 relative to the reading head 11, the large wide blister 28A bridges the ports 14, 15, 16 and 17.

Since at the start of the cycle, no water is in the washing machine, the water level control 19 has the member 24 thereof bridging the ports 21 and 18 whereby the inlet of the vacuum pump 22 is interconnected to the port 16 of the reading head 11. Since the vacuum pump 22 is interconnected to the port 16 of the reading head 11, the blister 28A of the program member 24 interconnects the inlet of the vacuum pump 22 to the ports 14, 15 and 17, whereby the vacuum is interconnected to the ports 34 and 36 of the reading head 31 by the flexible conduit means 45 and 46. However, since the blister 52A of the program member 48 is only bridging the ports 34 and 35, it can be seen that the vacuum source is only interconnected to the hot water actuator 41 to open the hot water inlet 38 so that only hot water flows through the mixer valve 37 to the washing machine, the aperture 53A of the program means 48 being aligned with the port 33 of the reading head 31 to interconnect the atmosphere to the cold water actuator 42 so that the same holds the cold water inlet 40 in its closed position.

The water mixing valve 37 continues to deliver hot water in the above manner to the washing machine until the water level therein causes the member 24 to disconnect the ports 22 and 18 thereof and interconnect the port 20 to the port 18 whereby atmosphere is now interconnected to the port 16 of the reading head 11. Since atmosphere is now at the port 16 of the reading head 11, the atmosphere is also interconnected to the hot water actuator 41 through the program members 24 and 48 so that the hot water actuator 41 will return to atmospheric condition to close the hot water inlet 39 whereby the actuator 41 is in its deactivated position as long as the water level in the washing machine tub is above the predetermined level set by the water level control 19.

During the "13½" minute increment to the "15" minute increment of movement of the program member 24 relative to the reading head 11 in the manner illustrated in FIGURE 4, the water in the washing machine is pumped out by suitable mechanism whereby the member 24 of the water level control 19 again moves to interconnect the ports 21 and 18. At the "15" minute increment of movement of the program member 24, the elongated blister 28C of the program member 24 bridges the ports 16, 14 and 13 for a period of approximately one minute whereby the inlet of the vacuum pump 22 is again interconnected to the port 36 of the reading head 31 and, by means of the blister 52A of the program member 48, to the hot water actuator 41 to open the hot water inlet 39 to inject hot water into the washing machine tub for a spray rinse operation. Since the port 16 of the reading head 11 is also interconnected to the port 13 by the blister 28C, the vacuum pump 22 is directly interconnected to the cold water actuator 42 to open the same during the spray rinse whereby the water delivered by the mixing valve 37 during the spray rinse is a warm water because the hot water and cold water are mixed therein. This is accomplished even though the aperture 53A of the program member 48 is interconnected to the port 33 because the aperture 53A does not let sufficient atmosphere into the conduit 44 to overcome the force of the pump 22 acting on the cold water actuator 42.

During the "15" minute increment to approximately "19½" minute increment of movement of the program member 24 as illustrated in FIGURE 4, the washing machine tub is spun in order to force the wash water out of the same. However, when the blisters 28E–28I begin to move over the reading head 11 the same interconnect the ports 13, 14, 16 and 17 together whereby both the hot water actuator 41 and the cold water actuator 42 are evacuated in the manner previously described to cause the mixing valve 37 to dispense warm water into the washing machine tub for a rinsing operation, the mixing valve 37 dispensing such warm water as long as the level of the water in the tub is below the level set by the control device 19. However, when the control device 19 senses that a predetermined amount of water is now in the washing machine tub, the member 24 interconnects the port 20 with the port 18 so that the atmosphere is again interconnected to the actuators 41 and 42 to turn off the mixing valve 37.

Therefore, it can be seen that the program means 24 and the program means 48 cooperate together to control the temperature of the water being delivered by the water mixing valve 37, the selector program member 48 being adapted to vary the temperature of the wash water and the temperature of the rinse water in the manner fully illustrated in FIGURE 5 even though the program member 24 has a set pattern of blisters and aperture means thereon.

Accordingly, it can be seen that this invention provides an improved control system for a domestic appliance or the like.

While the form of the invention now preferred has been disclosed as required by the statutes, other forms may be used, all coming within the scope of the claims which follow.

What is claimed is:

1. In combination, a first reading head having a reading surface interrupted by a plurality of ports, certain of said ports of said first reading head being vertically aligned, another of said ports of said first reading head being horizontally aligned with one of said certain ports of said first reading head, a first reading member movable relative to said first reading head and having means to interconnect certain of asid ports together, a pneumatic source adapted to be interconnected to one of said ports of said first reading head, a water mixing valve having a hot water pneumatically operated actuator and a cold water pneumatically operated actuator, a second reading head having a reading surface interrupted by a plurality of ports, certain of said ports of said second reading head being interconnected to said actuators of said mixing valve and other of said ports of said second reading head being interconnected to ports of said first reading head, and a second reading member movable relative to said second reading head and having means to interconnect together various of said ports of said second reading head to control the temperature of the water delivered by said mixing valve.

2. A combination as set forth in claim 1 wherein said pneumatic source is a vacuum pump.

3. A combination as set forth in claim 1 wherein said first reading member has a flexible sheet provided with a plurality of open ended blisters for interconnecting together said ports of said first reading head in a predetermined sequence.

4. A combination as set forth in claim 3 wherein said sheet has a plurality of aperture means for being aligned with certain of said ports of said first reading head in a predetermined sequence.

5. A combination as set forth in claim 1 wherein said second reading member has a flexible sheet provided with a plurality of open ended blisters for interconnecting together said ports of said second reading head in a predetermined pattern.

6. A combination as set forth in claim 5 wherein said sheet has a plurality of aperture means for being aligned with certain of said ports of said second reading head in a predetermined pattern.

7. A combination as set forth in claim 1 wherein said first reading member is moved relative to said first reading head by motor means.

8. A combination as set forth in claim 1 wherein said second reading member is manually movable relative to said second reading head.

9. A combination as set forth in claim 1 wherein a water level device interconnects said pneumatic source to said one port of said first reading head.

10. A combination as set forth in claim 9 wherein said water level device interconnects said one port of said first reading head to the atmosphere when the water level reaches a predetermined level.

11. In combination, a first reading head having a reading surface interrupted by first, second, third and fourth ports, said first, second and third ports being vertically aligned and said third and fourth ports being horizontally aligned, a first reading member movable relative to said first reading head and having means to selectively interconnect said first port to said other ports of said first reading head in a predetermined pattern, a pneumatic source adapted to be interconnected to said first port, a water mixing valve having a hot water pneumatically operated actuator and a cold water pneumatically operated actuator, a second reading head having a reading surface interrupted by fifth, sixth, seventh and eighth ports, means interconnecting said second and fifth ports to said cold water actuator, means interconnecting said sixth port to said hot water actuator, means interconnecting said third and seventh ports together, means interconnecting said fourth and eighth ports together, and a second reading member movable relative to said second reading head and having means to interconnect together various of said ports of said second reading head to control the temperature of the water delivered by said mixing valve.

12. A combination as set forth in claim 11 wherein said means interconnecting said second and fifth ports to said cold water actuator also interconnects said second and fifth ports together.

13. A combination as set forth in claim 11 wherein said first reading member has wide open ended blister means to bridge said first, third and fourth ports.

14. A combination as set forth in claim 11 wherein said first reading member has narrow open ended blister means to bridge only said first, second and third ports.

15. A combination as set forth in claim 11 wherein said fifth, sixth, seventh and eighth ports are vertically aligned.

16. A combination as set forth in claim 15 wherein said second reading member includes an open ended blister means for bridging only two ports of said second reading head.

17. A combination as set forth in claim 15 wherein said second reading member includes two open ended blister means for each simultaneously bridging two ports of said second reading head.

18. A combination as set forth in claim 15 wherein said second reading member includes an open ended blister means for bridging only three ports of said reading head.

References Cited
UNITED STATES PATENTS

| | | | |
|---|---|---|---|
| 3,043,328 | 7/1962 | Taylor | 137—624.2 X |
| 3,199,412 | 8/1965 | Palmer | 137—624.18 X |
| 3,216,326 | 11/1965 | Rice | 137—624.18 X |
| 3,256,692 | 6/1966 | Rice | 137—624.2 X |
| 3,237,529 | 3/1966 | Beck | 137—637.1 X |

ALAN COHAN, *Primary Examiner.*